US012326102B2

(12) United States Patent
Krieger et al.

(10) Patent No.: US 12,326,102 B2
(45) Date of Patent: Jun. 10, 2025

(54) CDA LIFTER WITH HYDRAULIC CONTROL FEED FROM OUTSIDE THE ENGINE BLOCK

(71) Applicant: Eaton Intelligent Power Limited, Dublin (IE)

(72) Inventors: Ryan Krieger, Portage, MI (US); Bryar Peters, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/962,882

(22) Filed: Nov. 27, 2024

(65) Prior Publication Data

US 2025/0092804 A1 Mar. 20, 2025

Related U.S. Application Data

(63) Continuation of application No. PCT/EP2023/025264, filed on Jun. 2, 2023.

(60) Provisional application No. 63/348,632, filed on Jun. 3, 2022.

(51) Int. Cl.
*F01L 1/245* (2006.01)
*F01L 1/46* (2006.01)
*F01L 13/00* (2006.01)
*F02D 13/06* (2006.01)

(52) U.S. Cl.
CPC ................. *F01L 1/245* (2013.01); *F01L 1/46* (2013.01); *F01L 13/0005* (2013.01); *F01L 2001/256* (2013.01); *F01L 2013/001* (2013.01); *F01L 2307/00* (2020.05); *F02D 13/06* (2013.01)

(58) Field of Classification Search
CPC ... F01L 1/245; F01L 1/256; F01L 1/46; F01L 13/0005; F01L 2013/001; F01L 2307/00; F02D 13/06
USPC ........................................................ 123/90.5
See application file for complete search history.

(56) References Cited

U.S. PATENT DOCUMENTS 4,173,954 A 11/1979 Speckhart
5,934,232 A * 8/1999 Greene ..................... F01L 1/14 123/90.55
10,132,208 B2 11/2018 Nielsen
2003/0075129 A1* 4/2003 Spath .................. F01L 13/0005 123/90.16
2005/0081811 A1* 4/2005 Spath ........................ F01L 1/24 123/90.48
2006/0162679 A1* 7/2006 Schnell ................. F01L 1/2422 123/90.48

(Continued)

FOREIGN PATENT DOCUMENTS

DE 102014220386 B3 2/2016

OTHER PUBLICATIONS

International search report and Written Opinion received for PCT Application No. PCT/EP2023/025264, 8 pages, Sep. 15, 2023.

*Primary Examiner* — Jorge L Leon, Jr.
(74) *Attorney, Agent, or Firm* — Baker Botts L.L.P.

(57) ABSTRACT

In one embodiment, a lifter assembly comprises a lifter having a latching mechanism, a slot arranged on an outer wall of the lifter and comprising an inlet that provides access to the latching mechanism, and a pin comprising a fluid channel. The latching mechanism is switchable between a latched position and an unlatched position. The pin is configured to interface with the slot such that the lifter is prevented from rotation about a lifter axis. The fluid channel is configured to be fluidly coupled to the inlet of the slot.

29 Claims, 4 Drawing Sheets

(56) References Cited

U.S. PATENT DOCUMENTS

| | | | | |
|---|---|---|---|---|
| 2009/0308339 | A1* | 12/2009 | Hendriksma ............ | F01L 1/14<br>123/90.46 |
| 2020/0025045 | A1 | 1/2020 | Woon | |

* cited by examiner

CDA LIFTER WITH HYDRAULIC CONTROL FEED FROM OUTSIDE THE ENGINE BLOCK

PRIORITY

This application claims the benefit under 35 U.S.C. § 365 (c) of International Patent Application No. PCT/EP2023/025264, filed 2 Jun. 2023, which claims the benefit of U.S. Provisional Patent Application No. 63/348,632, filed 3 Jun. 2022, each of which is incorporated herein by reference.

TECHNICAL FIELD

This disclosure generally relates to a system for controlling cylinder deactivation (CDA), and more particularly to a CDA lifter having hydraulic control feed from outside of an engine block.

BACKGROUND

Various lifter designs have been produced in the past for use in valvetrain systems of an internal combustion engine. Generally, such lifter is coupled to a camshaft on one side and to an engine cylinder on the other side in a way for delivering actuation motion from the camshaft to downstream valves located in the cylinder. Independent cylinder control for cylinder deactivation—that is, selected cylinder combination may be disabled by deactivating the valves in those cylinders—is highly desirable especially for multi-cylinder engine, for example, in order to better adjust engine and/or fuel efficiency on demand. Typically, in a lifter constructed to achieve such CDA function, hydraulic switching components (e.g., latching mechanism) are usually employed, which, in operation, may rapidly shift the system from activation mode (i.e., valve actuation motion provided by the camshaft is allowed to be delivered to the cylinder) to deactivation mode (e.g., motion originated from the camshaft is absorbed by the hydraulic switching components, thus the respective valve is unactuated,) or vice versa as needed. However, this usually requires additional fluid passages that run inside the engine block to feed control pressure to the selected lifter, thus significantly increasing overall system complexity. It also requires extensive machining to recast the engine block to accommodate the complex passage designs, making the construction process costly and time-consuming.

Accordingly, there exists a need to design a simplified system that permits hydraulic control of CDA operation without introducing substantial engine complexity.

SUMMARY OF PARTICULAR EMBODIMENTS

The disclosure presents a simplified lifter assembly for controlling CDA operation. In particular, the lifter assembly according to this disclosure utilizes a pin-and-slot combination to both prevent undesired rotational movement of a roller lifter and at the same time enable hydraulic pressure control for CDA operation. The disclosure moreover presents an engine block assembly that houses a lifter of such configurations and is suitable to receive hydraulic control feed from outside.

By feeding control fluid through fluid passages of the anti-rotation slot and pin, the need for additional fluid circuit inside the engine block may be eliminated. Furthermore, since the pin may be mounted from outside the engine block, a hydraulic feed source may be routed externally to the pin for controlling CDA switching. In this way, it may allow simple modification to existing engine condition to fit to CDA requirements, thereby reducing construction cost and program timing.

An embodiment of a lifter assembly according to this disclosure comprises a lifter having a latching mechanism, a slot arranged on an outer wall of the lifter and comprising an inlet that provides access to the latching mechanism, and a pin comprising a fluid channel. In particular, the latching mechanism may be switchable between a latched position and an unlatched position. In the same embodiment, the pin is configured to interface with the slot such that the lifter is prevented from rotation about a lifter axis. Furthermore, the fluid channel is configured to be fluidly coupled to the inlet of the slot.

In particular embodiments, the slot is elongated in shape. In particular embodiments, the slot has a length that is configured to maintain engagement with the pin as the lifter travels in a vertical direction. In particular embodiments, the slot is configured to receive an end of the pin. In particular embodiments, the slot has a width that is slightly larger than an outer diameter of the end of the pin.

In particular embodiments, when the pin interfaces with the slot, a clearance is formed between an end of the pin and a bottom surface of the slot in order to allow fluid communication. In particular embodiments, the inlet is arranged at a bottom surface of the slot. In particular embodiments, the fluid channel is in proximity to the inlet when the lifter is on a base circle position. In particular embodiments, the latching mechanism is configured to switch to the unlatched position by means of fluid pressure supplied via the fluid channel of the pin.

In particular embodiments, the lifter assembly is configured to be housed inside an engine block. In particular embodiments, the pin is configured to be mounted into the engine block from the outside. In particular embodiments, the fluid channel is configured to be fluidly coupled to a fluid supply external to the engine block.

An embodiment of an engine block assembly according to this disclosure comprises an engine block, a lifter assembly housed inside the engine block, and a pin mounted from outside of the engine block and comprising a fluid channel. In particular, the lifter assembly may comprise a lifter having a latching mechanism. The latching mechanism is switchable between a latched position and an unlatched position. Furthermore, the pin is configured to interface with the slot such that the lifter is prevented from rotation about a lifter axis. The fluid channel is configured to be fluidly coupled to the inlet of the slot.

In particular embodiments, the fluid channel is configured to be fluidly coupled to a fluid supply external to the engine block. In particular embodiments, the pin comprises a head that is configured to be mounted against an outer wall of the engine block. In particular embodiments, the pin comprises a body portion that is configured to extend through an outer wall of the engine block. In particular embodiments, the pin comprises an end that is configured to fit into the slot. In particular embodiments, the slot is elongated in shape. In particular embodiments, the slot has a length that is configured to maintain engagement with the pin as the lifter travels in a vertical direction. In particular embodiments, when the pin interfaces with the slot, a clearance is formed between an end of the pin and a bottom surface of the slot in order to allow fluid communication.

BRIEF DESCRIPTION OF THE DRAWINGS

Embodiments in accordance with this disclosure will now be described by reference to the accompanying drawings, in which.

DESCRIPTION OF EXAMPLE EMBODIMENTS

Reference will now be made in detail to the examples which are illustrated in the accompanying drawings. Wherever possible, the same reference numbers will be used throughout the drawings to refer to the same or like parts. Directional references such as "up", "down", "right", and "left" are for ease of reference to the figures and not intended to limit the scope of this disclosure.

Figure 1:
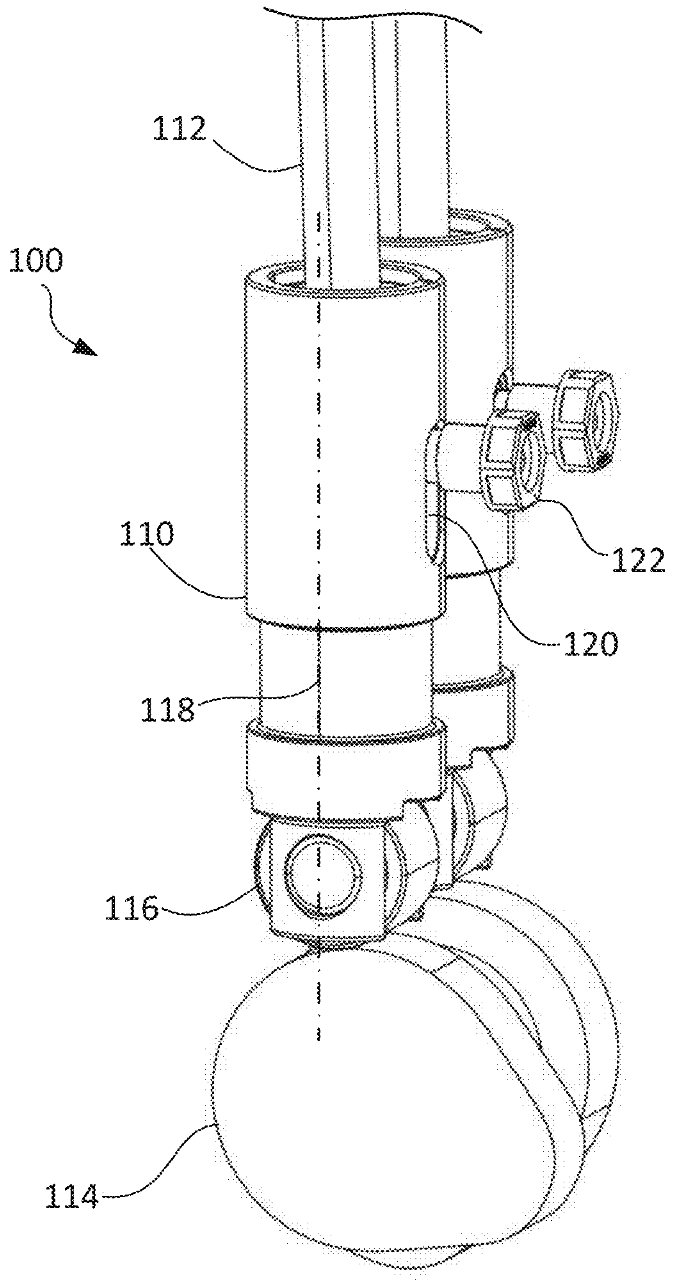
FIG. 1 illustrates a lifter assembly according to this disclosure.

FIG. 1 illustrates an example lifter assembly 100 in accordance with one embodiment of this disclosure, which may typically be housed inside an engine block (not shown). In practice, a pair of lifter assemblies may be provided for each engine cylinder for performing intake and exhaust function, respectively. However, for sake of simplicity of this disclosure, the following is described with reference to only one lifter assembly 100, which is shown at the front in FIG. 1.

In the illustrated embodiment, the lifter assembly 100 comprises a roller lifter 110 that may ride, at a roller bearing 116 thereof, on a camshaft 114 and is configured to reciprocate in a vertical direction along a lifter axis 118 in a controllable manner upon actuation by camshaft rotation. As depicted, upper portion of the roller lifter 110 may be coupled to a lower end of a push rod 112, while an upper end of the push rod 112 may in turn engage with a rocker arm (not shown). Configured as such, vertical displacement of the roller lifter 110—i.e., by rotation of the camshaft 114—may be conveyed through the push rod 112 to the rocker arm, thereby causing the rocker arm to rotate to activate the associated cylinder as needed.

In particular embodiments, the lifter assembly 100 may be configured for providing so-called CDA functionalities, i.e., a chosen combination of cylinders is systematically disabled, for example, for better fuel economy or overall engine efficiency such that the system may operate on fewer cylinders when less power output is demanded. To this end, the roller lifter 110 may be provided with various switching components to selectively enable and/or disable motion transfer from the camshaft 114 to the rocker arm. For example, the switching components may mechanically switch the roller lifter 110 between a latched mode for cylinder activation and an unlatched mode for cylinder deactivation. Details of the switching components will be described below with reference to FIG. 2.

Figure 2:
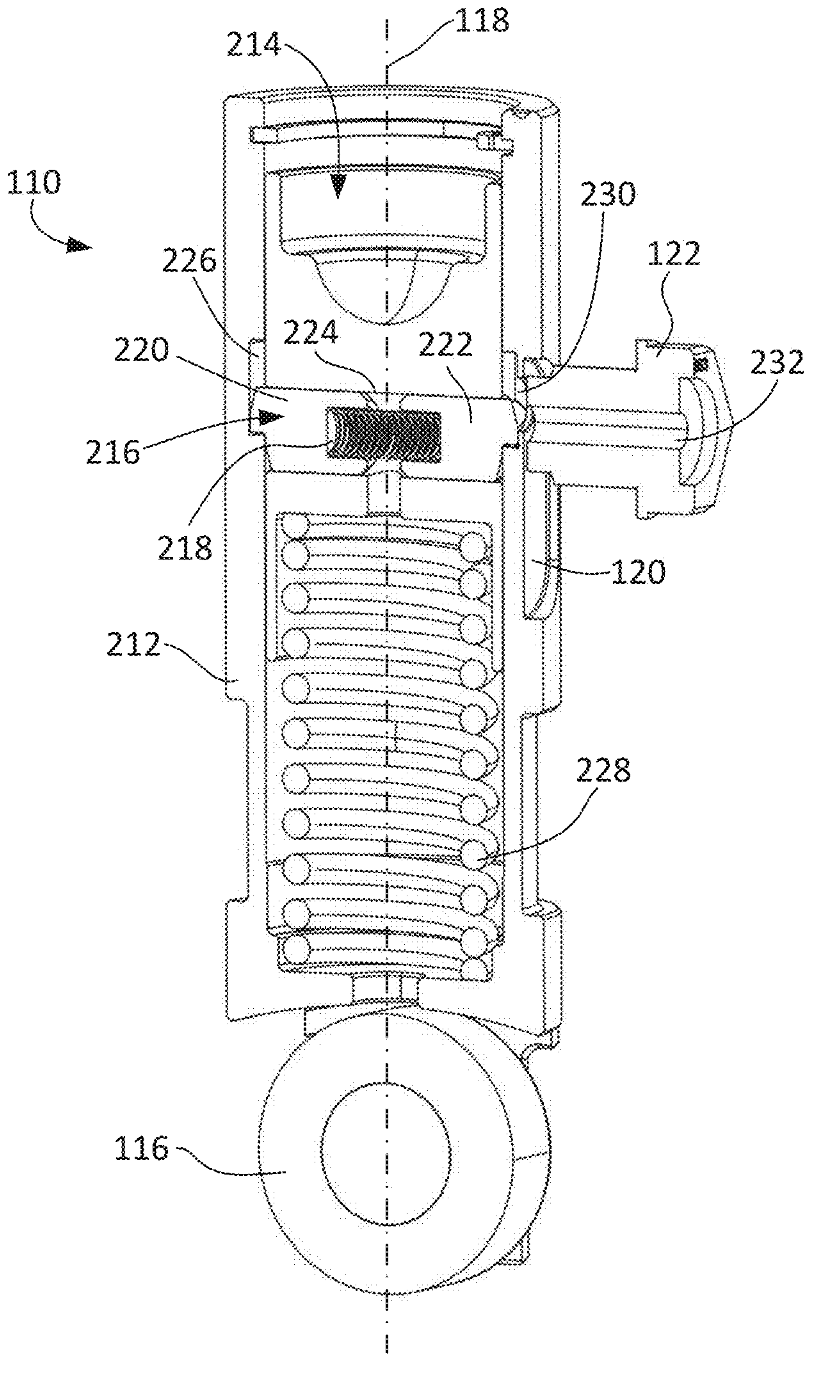
FIG. 2 illustrates a cross-sectional view of the lifter assembly of FIG. 1.

FIG. 2 illustrates a cross-sectional view of the lifter assembly 100 taken along the lifter axis 118. In particular embodiments, the roller lifter 110 may comprise an outer body 212 and an inner body 214 positioned inside the outer body 212 and configured to be able to travel vertically relative to the outer body 212 as demanded. For example, the inner body 214 may comprise a collapsible latching mechanism 216 that is housed in a chamber 224 and designed to mechanically switch between a latched position and an unlatched position. As an example and not by way of limitation, the latching mechanism 216 may include two latch pins 220, 222 and a spring 218 connected therebetween. In operation, the inner body 214 may be fixed relative to the outer body 212 in the default latched position where a biasing force applied by the spring 218 may push the two latch pins 220, 222 outwards into engagement with an annular recess 226 of the outer body 212. Such latched configuration is depicted in FIG. 2. When this happens, the inner body 214 is locked tight with the outer body 212 by the latching mechanism 216 in the extended state, thus enabling motion transmission through the roller lifter 110 to activate the associated engine cylinder. In other words, the system is in lift mode. Conversely, for example, when cylinder deactivation is needed, hydraulic pressure may be communicated to the chamber 224 so as to compress the latch pins 220, 222 to an extent that the latch pins 220, 222 retract out of engagement from the annular recess 226. In this case, the inner body 214 is released and free to translate along the vertical direction inside the outer body 212 such that any actuation motion applied via the camshaft 114 may be absorbed by the up-and-down displacement between the inner body 214 and the outer body 212. In some embodiments, a lost motion spring 228 may be arranged inside the roller lifter 110 to dampen the relative movement of the inner body 214 and the outer body 212. When switching back to lift mode, hydraulic pressure supply to the chamber 224 may be cut off, and the spring 218 may again bias the two latch pins 220, 222 outwards to return to the latched position.

It will be appreciated that the switching components described herein is merely exemplary and not intended to limit the scope of this disclosure. Although the above explains switching of the roller lifter by referencing to particular components, these components are provided for illustration purposes only and are not necessarily a requirement. In some embodiments, one or more components may be omitted from or added to the roller lifter. Other suitable configurations of the roller lifter may be apparent to those skilled in the art and are not explained in exhaustive details by this disclosure.

With continued reference to FIGS. 1 and 2, the roller lifter 110 according to this disclosure further comprises a slot 120, which may be configured to receive a pin 122. For example, the pin 122 may function as an anti-rotation pin that interfaces with the slot 120 in such a way that any rotational movement of the roller lifter 110 about the lifter axis 118 may be prevented. As such, the roller lifter 110 may maintain proper orientation inside a lifter bore (not shown), thereby ensuring alignment of the roller bearing 116 with the camshaft 114 and minimizing undesired wear. In addition, the slot 120 may advantageously comprise an inlet 230 that opens into the interior of the roller lifter 110. For example, the inlet 230 may be positioned near the annular recess 226 such that when the latching mechanism 216 catches the annular recess 226 in the latched configuration, the inlet 230 may provide access to the latching mechanism 216. Correspondingly, in particular embodiments, a fluid channel 232 may be arranged in the pin 122. The fluid channel 232 may be configured to be fluidly coupled with the inlet 230 for feeding fluid into the inlet 230. For example, in operation, in order to control cylinder deactivation, hydraulic pressure may be communicated—e.g., via an external fluid supply source—to the pin 122 through the fluid channel 232 to the slot 120 and finally into the inlet 230. As such, the latching mechanism 216 located internally may collapse under the hydraulic pressure, thus switching the roller lifter 110 into deactivation mode.

In configurations where the lifter assembly 100 is housed by the engine block, the pin 122 may be mounted from outside the engine block. For example, an external wall of the engine block may be modified with a through hole, for example, by drilling, boring or other suitable methods as familiar to those in the art. The pin 122 may be fitted into the through hole and further extend inwards so as to interface with the roller lifter 110. In particular embodiments, the fluid supply such as an oil control valve or other suitable fluid source as familiar to those skilled in the art may be connected to the pin 122 for feeding fluid to the roller lifter 110. As a non-limiting example, the fluid supply may be constructed external to the engine block and optionally comprises a mounting structure that may sit over and fluidly connects to the pin 122. Of course, it will be appreciated that while illustrated as such, the disclosure is not so limited. Other suitable configurations of the fluid supply are also envisioned by this disclosure. For example, a tube or a manifold may be directed to the pin 122 for providing hydraulic feed.

For a conventional system to control cylinder deactivation, an individual fluid circuit is typically required, which is routed inside the engine block to the roller lifter so as to hydraulicly control switching. However, this leads to complex passage designs in the engine architecture and requires recasting and/or redesigning of the engine block, which significantly increases cost and program timing. The design of the lifter assembly 100 according to this disclosure contrasts those of prior art since it incorporates the fluid feed and anti-rotation capabilities into a single pin-and-slot configuration, thereby significantly reducing design complexity of the overall system and making the machining process simpler and more cost effective. Furthermore, by routing the hydraulic control feed external to the engine block, the system disclosed herein eliminates the need of engine recast and enables simple modification to the existing engine condition, thus allowing the engine block to be easily adapted to fit specific customer requirements.

Figure 4:
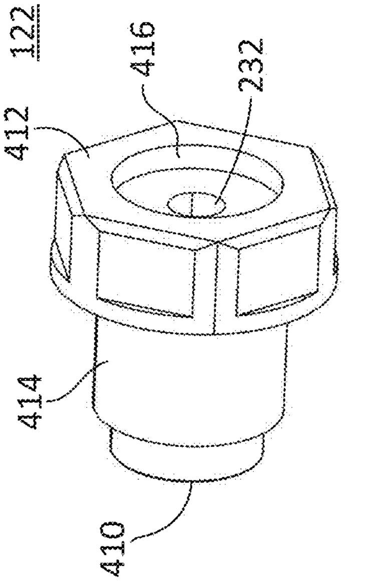
FIGS. 4 and 5 illustrate respective isometric and cross-sectional views of a pin according to this disclosure.
Figure 5:
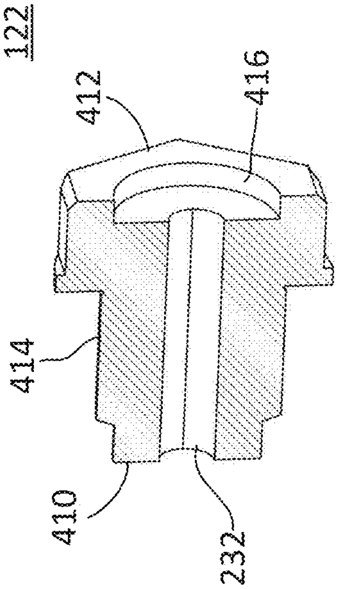
Figure 3:
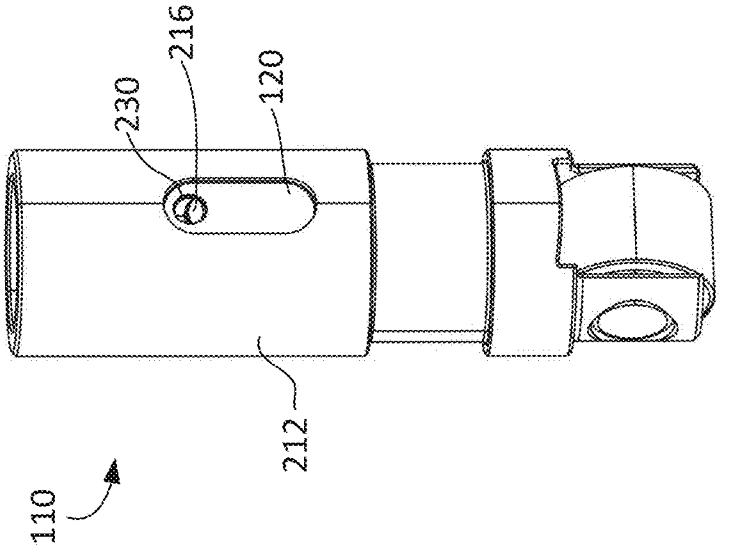
FIG. 3 illustrates a roller lifter according to this disclosure.

FIG. 3 illustrates a standalone view of the roller lifter 110, particularly showing the slot 120. In this embodiment, the slot 120 may be positioned on an outer wall of the roller lifter 110, for example, on an outer surface of the outer body 212. The slot 120 is suitable for interfacing with the pin 122. As an example and not by way of limitation, the slot 120 may be generally elongated in shape and oriented parallel to the lifter axis. For example, the length of the slot 120 may be configured to accommodate lifter stroke such that the slot 120 is able to maintain engagement with the pin 122 as the roller lifter 110 reciprocates vertically. As another example, the slot 120 may have a width that is slightly larger or substantially equal to an outer diameter of an end of the pin 122 (e.g., an end 410 as illustrated in FIGS. 4 and 5). Provided as such, the slot 120 may receive the pin 122 in such a manner to prevent rotation of the roller lifter 110 about the lifter axis while still allowing the pin 122 to travel in the vertical direction relative to the roller lifter 110. As a further example, the slot 120 may be designed with such a depth that when the pin 122 is properly inserted, there exists a certain clearance between the end of the pin 122 and a bottom surface of the slot 120. In this manner, when fluid is fed to the roller lifter 110, hydraulic connection between the roller lifter 110 and the pin 122 may be maintained to keep the fluid pressure at a desired level so as to compress the latching mechanism 216 as needed.

In particular embodiments, the slot 120 may comprise the inlet 230. For example, the inlet 230 may be arranged at the bottom surface of the slot 120 and provide access to interior structures of the roller lifter 110. In one embodiment, the inlet 230 may be positioned in a vertical location that is generally in alignment with the latching mechanism 216 in the latched configuration. In this way, fluid may be communicated through the inlet 230 into the roller lifter 110 to act upon the latching mechanism 216, thereby controlling the switching event.

FIGS. 4 and 5 show the pin 122 according to this disclosure. As already explained, the pin 122 may be suitable to interface with the slot 120 of the roller lifter 110. In particular embodiments, the pin 122 may be configured with a through passage 232 which may serve as a fluid channel for supplying fluid to the inlet 230 of the roller lifter 110. The through passage 232 may extend in a horizontal direction throughout the entire body of the pin 122. In particular embodiments, the pin 122 may comprise an end 410 that may be suitable to be received in the slot 120 of the roller lifter 110. For example, the end 410 may be generally cylindrical in shape and have a reduced diameter as compared to other portions of the pin 122. When received, the end 410 may guide vertical movement of the pin 122 along the slot 120 and at the same time resist rotation of roller lifter 110 about the lifter axis. In particular embodiments, the pin 122 may further comprise a head 412. For example, in scenarios where the pin 122 is mounted to the engine block from outside (e.g., by means of a mounting hole), the head 412 may press against the external wall of the engine block while a main body portion 414 of the pin 122 may extend through the external wall. In some example embodiments, although not shown, in order to facilitate mounting of the pin 122, outer surface of the pin 122 may be threaded such that the pin 122 may be screwed into the engine block. Additionally or alternatively, other suitable mounting features (e.g., fasteners, clamps, etc.) may be provided to help securing the pin 122 in place. In particular embodiments, the head 412 may be ported to a fluid supply. For example, the head 412 may be structured in a way to facilitate such fluid connection. In the embodiment as shown, the head 412 may include a cavity 416 that is suitable for receiving the supplied fluid and directing it to the through passage 232. As further shown, the head 412 may take form similar to a bolt having a hexagon structure so as to fit to the fluid supply. While described in this way, a skilled person in the art will understood that the pin 122 may be formed differently for performing the desired function of this disclosure.

Figure 6:
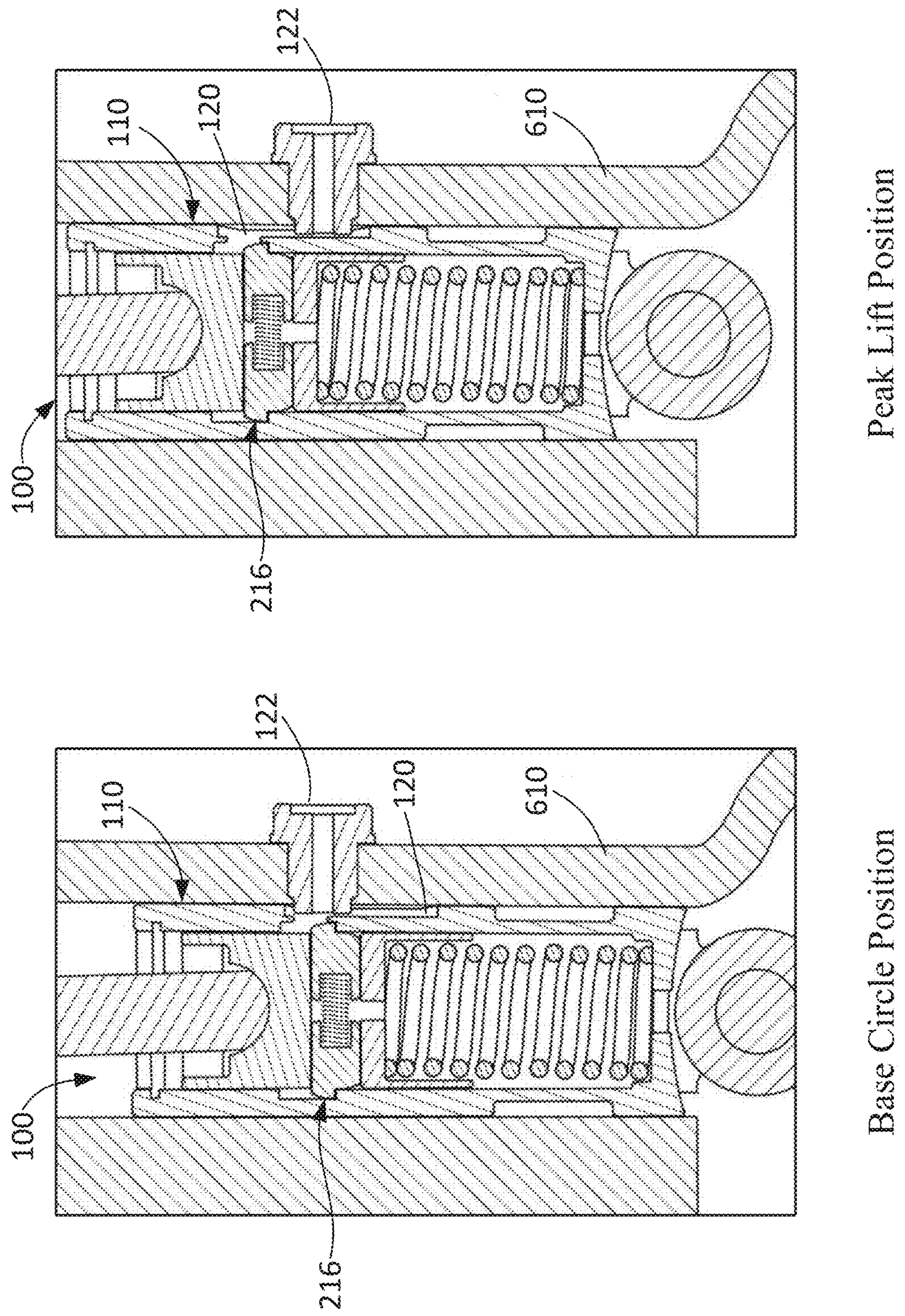
FIG. 6 illustrates the lifter assembly when it is on base circle and peak lift position, respectively.

FIG. 6 schematically illustrates the lifter assembly 100 when it is on base circle position and peak lift position, respectively. As shown, the lifter assembly 100 is housed inside an engine block 610. The pin 122 is inserted through an outer wall of the engine block 610 and extends further inwards into engagement with the slot 120 of the roller lifter 110 located inside the engine block 610. While not shown, a fluid circuit may be coupled to the pin 122 from outside the engine block 610 in order to feed hydraulic pressure to the roller lifter 110 to control CDA function on demand. During operation, when the roller lifter 110 is on base circle (i.e., the lowest position as shown on the left where it receives zero lift from the camshaft), the pin 122 may be in such a relative position to the roller lifter 110 that the pin 122 is directly aligned with the latching mechanism 216. In some embodiments, it may be desirable for switching to occur in this configuration, in which fluid may flow in through the pin 122 and pushes the latching mechanism 216 to the unlatched position. When the roller lifter 110 is at peak lift, which is depicted on the right of FIG. 6, the pin 122 may be located at a lower position in the slot 120. In case if cylinder deactivation is still demanded, fluid may still be supplied— i.e., from the pin 122 via the clearance between the end of the pin 122 and the bottom surface of the slot 120 to the inlet 230—to keep the latching mechanism 216 retracted.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A lifter assembly, comprising:

a lifter comprising a latching mechanism configured to switch between a latched position and an unlatched position, a slot arranged on an outer wall of the lifter, the slot comprising an inlet communicating with the latching mechanism, and a pin operatively coupled to a structure outside the lifter assembly and configured to interface with the slot such that the lifter assembly is prevented from rotating about a lifter axis, the pin comprising a fluid channel configured to be fluidly coupled to the inlet of the slot.

2. The lifter assembly of claim 1, wherein the slot is defines an elongated shape.

3. The lifter assembly of claim 2, wherein a length of the slot is configured to maintain engagement with the pin as the lifter reciprocates along the lifter axis.

4. The lifter assembly of claim 1, wherein the slot is configured to receive an end of the pin.

5. The lifter assembly of claim 4, wherein a width of the slot is greater than an outer diameter of the end of the pin.

6. The lifter assembly of claim 1, a clearance is formed between an end of the pin and a bottom surface of the slot so as to maintain fluid communication between the fluid channel and the inlet as the lifter reciprocates along the lifter axis.

7. The lifter assembly of claim 1, wherein the inlet is arranged at a bottom surface of the slot.

8. The lifter assembly of claim 1, wherein the fluid channel is aligned with the inlet when the lifter is on a base circle position.

9. The lifter assembly of claim 1, wherein the latching mechanism is configured to switch to the unlatched position when a fluid pressure is supplied to the inlet via the fluid channel of the pin.

10. The lifter assembly of claim 1, wherein the lifter assembly is configured to be housed inside an engine block, and wherein the engine block serves as the structure outside the lifter assembly such that the pin is mounted through an outer wall of the engine block so as to interface with the slot.

11. The lifter assembly of claim 10, wherein the fluid channel is further configured to be fluidly coupled to a fluid supply external to the engine block.

12. An engine block assembly, comprising:

an engine block; and a lifter assembly housed inside the engine block, the lifter assembly comprising:

a lifter comprising a latching mechanism configured to switch between a latched position and an unlatched position, a slot arranged on an outer wall of the lifter, the slot comprising an inlet communicating with the latching mechanism, and a pin configured to interface with the slot such that the lifter is prevented from rotating about a lifter axis, the pin comprising a fluid channel configured to be fluidly coupled to the inlet of the slot;

wherein the pin is mounted through an outer wall of the engine block so as to interface with the slot.

13. The engine block assembly of claim 12, wherein the fluid channel is further configured to be fluidly coupled to a fluid supply external to the engine block.

14. The engine block assembly of claim 12, wherein the pin further includes a head is configured to be mounted against the outer wall of the engine block.

15. The engine block assembly of claim 12, wherein the pin further includes a body portion configured to extend through the outer wall of the engine block.

16. The engine block assembly of claim 12, wherein the pin further includes an end configured to interface with the slot.

17. The engine block assembly of claim 12, wherein the slot defines an elongated shape.

18. The engine block assembly of claim 17, wherein a length of the slot is configured to maintain engagement with the pin as the lifter reciprocates along the lifter axis.

19. The engine block assembly of claim 12, wherein a clearance is formed between an end of the pin and a bottom surface of the slot so as to maintain fluid communication between the fluid channel and the inlet as the lifter reciprocates along the lifter axis.

20. A lifter assembly, comprising:

a lifter comprising a latching mechanism configured to switch between a latched position and an unlatched position, a slot arranged on an outer wall of the lifter, the slot comprising an inlet communicating with the latching mechanism, and a pin configured to interface with the slot such that the lifter assembly is prevented from rotating about a lifter axis, the pin comprising a fluid channel configured to be fluidly coupled to the inlet of the slot so as to convey a fluid pressure which actuates the latching mechanism between the latched position and the unlatched position.

21. The lifter assembly of claim 20, wherein the slot defines an elongated shape, wherein a length of the slot is configured to maintain engagement with the pin as the lifter reciprocates along the lifter axis.

22. The lifter assembly of claim 20, wherein the slot is configured to receive an end of the pin.

23. The lifter assembly of claim 22, wherein a width of the slot is greater than an outer diameter of the end of the pin.

24. The lifter assembly of claim 20, wherein a clearance is formed between an end of the pin and a bottom surface of the slot so as to maintain fluid communication between the fluid channel and the inlet as the lifter reciprocates along the lifter axis.

25. The lifter assembly of claim 20, wherein the inlet is arranged at a bottom surface of the slot.

26. The lifter assembly of claim 20, wherein the fluid channel is aligned with the inlet when the lifter is on a base circle position.

27. The lifter assembly of claim 20, wherein the pin is operatively coupled to a structure outside the lifter assembly.

28. The lifter assembly of claim 27, wherein the lifter assembly is configured to be housed inside an engine block, and wherein the engine block serves as the structure outside the lifter assembly such that the pin is mounted through an outer wall of the engine block so as to interface with the slot.

29. The lifter assembly of claim 28, wherein the fluid channel is further configured to be fluidly coupled to a fluid supply external to the engine block.

* * * * *